United States Patent
Ojalvo et al.

(10) Patent No.: US 9,632,706 B2
(45) Date of Patent: Apr. 25, 2017

(54) ORDERING OF PARALLEL DATA STORAGE BASED ON DIE PROGRAMMING DURATIONS

(71) Applicant: APPLE INC., Cupertino, CA (US)

(72) Inventors: Shai Ojalvo, Herzlia Pituach (IL); Eyal Gurgi, Herzlia Pituach (IL); Yoav Kasorla, Herzlia Pituach (IL)

(73) Assignee: APPLE INC., Cupertino, CA (US)

( * ) Notice: Subject to any disclaimer, the term of this patent is extended or adjusted under 35 U.S.C. 154(b) by 57 days.

(21) Appl. No.: 14/588,947

(22) Filed: Jan. 4, 2015

(65) Prior Publication Data

US 2016/0196065 A1    Jul. 7, 2016

(51) Int. Cl.
*G06F 3/06* (2006.01)
*G06F 12/02* (2006.01)

(52) U.S. Cl.
CPC .............. *G06F 3/061* (2013.01); *G06F 3/064* (2013.01); *G06F 3/0688* (2013.01); *G06F 12/0246* (2013.01); *G06F 2212/1016* (2013.01); *G06F 2212/7207* (2013.01); *G06F 2212/7208* (2013.01)

(58) Field of Classification Search
CPC .............. G06F 3/0679; G06F 12/0246; G06F 2201/865; G06F 12/0238; G06F 3/061; G06F 12/00; G06F 3/0688; G06F 3/064; G06F 2212/1016; G06F 2212/7207; G06F 2212/7208; G11C 16/16; G11C 16/3445; G11C 16/349; G11C 2029/0409
See application file for complete search history.

(56) References Cited

U.S. PATENT DOCUMENTS

| | | | | |
|---|---|---|---|---|
| 7,856,528 | B1 * | 12/2010 | Frost ................... | G06F 11/1044 711/114 |
| 2008/0205148 | A1 * | 8/2008 | Kanda ................. | G11C 11/5621 365/185.17 |
| 2011/0010484 | A1 * | 1/2011 | Sprouse .............. | G11C 11/5628 711/103 |
| 2011/0035538 | A1 * | 2/2011 | Kim ...................... | G11C 16/10 711/103 |
| 2011/0191526 | A1 * | 8/2011 | Haukness ............. | G11C 16/32 711/103 |
| 2014/0254263 | A1 * | 9/2014 | Avila ..................... | G11C 16/10 365/185.03 |
| 2015/0179274 | A1 * | 6/2015 | Kim .................... | G11C 16/3418 711/103 |

* cited by examiner

*Primary Examiner* — Hashem Farrokh
(74) *Attorney, Agent, or Firm* — D.Kligler IP Services Ltd.

(57) ABSTRACT

A method includes, in a memory system that includes multiple memory units, holding information indicative of respective programming durations of the memory units. Data is stored in a stripe that includes a plurality of the memory units, by programming the memory units in the stripe in an order that is set based on the information.

20 Claims, 2 Drawing Sheets

US 9,632,706 B2

ORDERING OF PARALLEL DATA STORAGE BASED ON DIE PROGRAMMING DURATIONS

TECHNICAL FIELD

Embodiments described herein relate generally to memory devices, and particularly to methods and systems for parallel data storage.

SUMMARY

An embodiment that is described herein provides a method including, in a memory system that includes multiple memory units, holding information indicative of respective programming durations of the memory units. Data is stored in a stripe that includes a plurality of the memory units, by programming the memory units in the stripe in an order that is set based on the information.

In some embodiments, storing the data includes setting the order to first program a memory unit having a longest programming duration among the memory units in the stripe. In an embodiment, storing the data includes setting the order to be inversely related to the respective programming durations of the memory units in the stripe.

In some embodiments, the method includes estimating the programming durations of the memory units, and generating the information, during production testing of the memory system or of the memory units. In other embodiment, the method includes estimating the programming durations of the memory units, and updating the information, during operation of the memory system in a host system.

In an embodiment, the memory units include respective memory dies. In another embodiment, the information includes a table that specifies the order for the stripe, and storing the data includes querying the table and programming the memory units in the stripe in accordance with the order specified in the table.

There is additionally provided, in accordance with an embodiment that is described herein, an apparatus including multiple memory units and a processor. The processor is configured to hold information indicative of respective programming durations of the memory units, and to store data in a stripe that includes a plurality of the memory units by programming the memory units in the stripe in an order that is set based on the information.

There is further provided, in accordance with an embodiment that is described herein, an apparatus including an interface and a processor. The interface is configured to communicate with a memory including multiple memory units. The processor is configured to hold information indicative of respective programming durations of the memory units, and to store data in a stripe that includes a plurality of the memory units by programming the memory units in the stripe in an order that is set based on the information.

These and other embodiments will be more fully understood from the following detailed description of the embodiments thereof, taken together with the drawings in which:

DETAILED DESCRIPTION OF EMBODIMENTS

Overview

Embodiments that are described herein provide improved methods and systems for parallel data storage in non-volatile memory. In the disclosed embodiments, a memory system comprises multiple memory units and a processor that stores data in the memory units. In the embodiments described herein the memory units comprise Flash dies, but the disclosed techniques can be used with various other suitable memory units.

In order to improve storage performance, the processor stores data in parallel over a group of dies referred to as a stripe. In a typical parallel storage operation, the processor sends multiple data pages for storage—A respective page to each die of the stripe. The operation is considered complete when all dies acknowledge that they have successfully stored their respective data pages.

In practice, however, the parallel storage operation is not entirely parallel. For example, when the processor communicates with the dies over a single bus, the data pages are sent to the dies one after the other over the bus. As a result, the dies begin storing their respective data pages in a staggered manner. Moreover, the programming duration, i.e., the time duration needed for a die to program a memory page, varies statistically from one die to another.

In some embodiments, the processor improves the parallelization of the parallel storage operation by sending the data to the dies in an order that depends on the actual programming durations of the dies. Typically, slower dies are positioned first in the order, and faster dies are positioned last. By setting the programming order in this manner, slower dies begin programming their respective data pages early. As a result, the overall programming duration of the stripe is minimized.

In an example embodiment, the processor holds information that is indicative of the programming durations of the various dies. When preparing to store data in a given stripe, the processor queries the information and sets the die programming order accordingly. The information may comprise, for example, a mapping table that specifies the desired programming order of the dies. Such a table may be generated during production of the dies or of the memory system, and/or during normal operation of the memory system.

System Description

Figure 1:
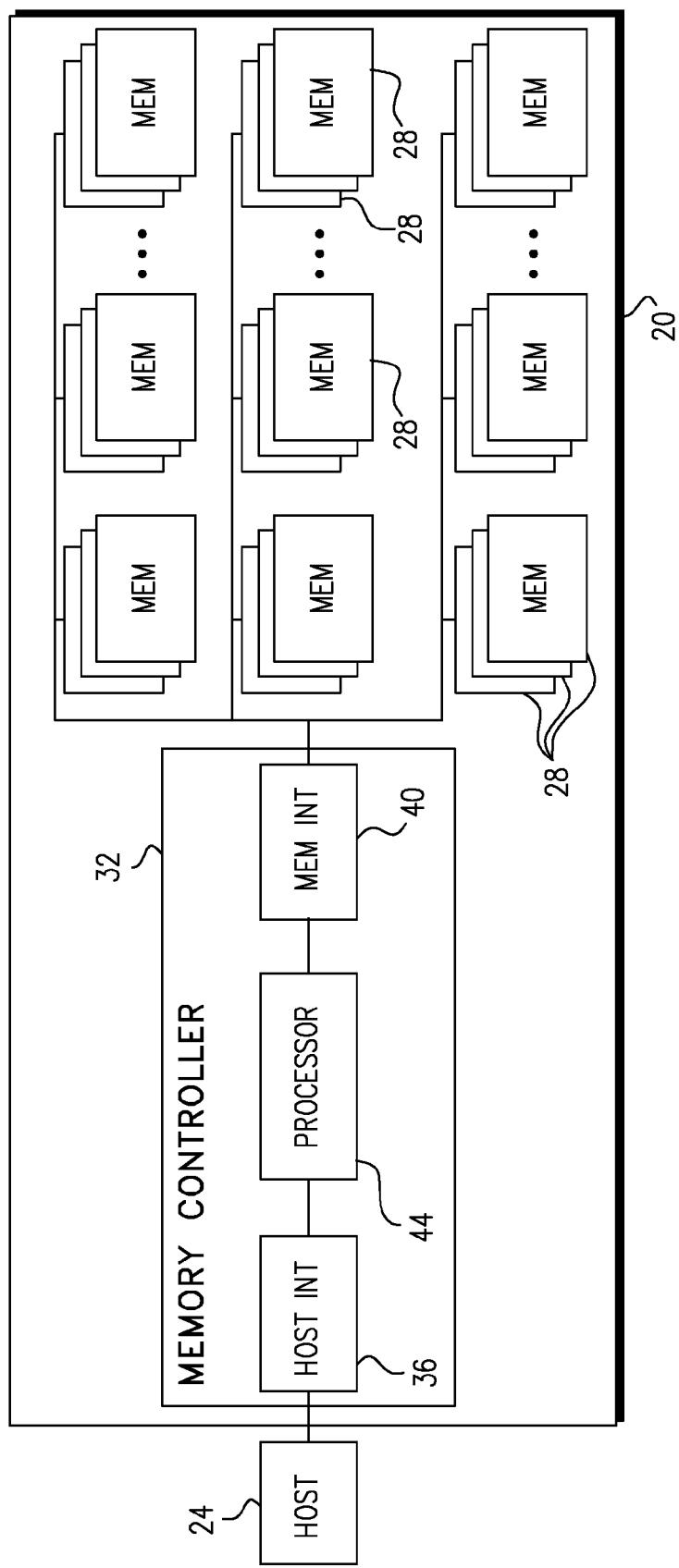
FIG. 1 is a block diagram that schematically illustrates a memory system, in accordance with an embodiment that is described herein.

FIG. 1 is a block diagram that schematically illustrates a memory system 20, in accordance with an embodiment that is described herein. System 20 accepts data for storage from a host 24 and stores it in memory, and retrieves data from memory and provides it to the host. In the present example, system 20 comprises a Solid-State Disk (SSD) that stores data for a host computer. In alternative embodiments, however, system 20 may be used in any other suitable application and with any other suitable host, such as in computing devices, mobile phones or other communication terminals, removable memory modules such as removable memory modules, Secure Digital (SD) cards, Multi-Media Cards (MMC) and embedded MMC (eMMC), digital cameras, music and other media players and/or any other system or device in which data is stored and retrieved.

System 20 comprises multiple memory devices 28, each comprising multiple analog memory cells. In the present example, devices 28 comprise non-volatile NAND Flash devices, although any other suitable memory type, such as NOR and Charge Trap Flash (CTF) Flash cells, phase change RAM (PRAM, also referred to as Phase Change Memory—PCM), Nitride Read Only Memory (NROM), Resistive RAM (RRAM or ReRAM), Ferroelectric RAM (FRAM) and/or magnetic RAM (MRAM), or various three-dimensional memory configurations, can also be used. Although the embodiments described herein refer mainly to NVM, the disclosed techniques can also be applied in volatile memory devices.

The memory cells are typically arranged in rows and columns. Typically, a given memory device comprises multiple erasure blocks (also referred to as memory blocks), i.e., groups of memory cells that are erased together. Data typically cannot be reprogrammed in-place, and memory blocks are therefore erased before being programmed with other data.

As noted above, each memory device 28 may comprise a packaged device or an unpackaged semiconductor chip or die. A typical memory system may comprise a number of 4 GB, 8 GB or higher capacity memory devices. Generally, however, system 20 may comprise any suitable number of memory devices of any desired type and size.

System 20 comprises a memory controller 32, which accepts data from host 24 and stores it in memory devices 28, and retrieves data from the memory devices and provides it to the host. Memory controller 32 comprises a host interface 36 for communicating with host 24, a memory interface 40 for communicating with memory devices 28, and a processor 44 that processes the stored and retrieved data. The software running on processor 44 may comprise storage management software that is sometimes referred to as "Flash management" or "Flash Translation Layer" (FTL).

The functions of processor 44 can be implemented, for example, using software running on a suitable Central Processing Unit (CPU), using hardware (e.g., state machine or other logic), or using a combination of software and hardware elements.

Memory controller 32, and in particular processor 44, may be implemented in hardware. Alternatively, the memory controller may comprise a microprocessor that runs suitable software, or a combination of hardware and software elements. In some embodiments, processor 44 comprises one or more processors capable of executing software for carrying out the functions described herein. The software may be downloaded to the processors in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory devices 28 and memory controller 32 are implemented as separate Integrated Circuits (ICs). In alternative embodiments, however, the memory devices and the memory controller may be integrated on separate semiconductor dice in a single Multi-Chip Package (MCP) or System on Chip (SoC), and may be interconnected by an internal bus. Further alternatively, some or all of the memory controller circuitry may reside on the same die on which one or more of the memory devices are disposed. Further alternatively, some or all of the functionality of memory controller 32 can be implemented in software and carried out by a processor or other element of the host system, or by any other type of memory controller. In some embodiments, host 24 and Memory controller 32 may be fabricated on the same die, or on separate dice in the same device package.

Configuring the Order of Parallel Programming Based on Die $T_{PROG}$

In some embodiments, processor 44 of memory controller 32 stores data in parallel over groups of memory units referred to as stripes. The description that follows refers mainly to parallel storage over multiple Flash dies. Alternatively, however, a stripe may comprise multiple memory units of any other suitable kind.

In some embodiments, although not necessarily, processor 44 stores the data in each strip using a redundant storage scheme, e.g., Redundant Array of Inexpensive Disks (RAID).

In a typical parallel storage operation, processor 44 sends multiple data pages for storage, one respective page to each die of the stripe. The processor typically sends a sequence of page programming commands to the respective dies over the bus connecting memory controller 32 to memory devices 28. Each die stores the respective data page upon receiving it, and acknowledges successful storage. Processor 44 regards the parallel storage operation complete when all dies have acknowledged successful storage.

As can be seen from the description above, the different dies in the stripe generally do not begin storing their respective data pages at the same time, but rather in a staggered manner. The first die in the sequence of page write commands will receive its data page first and thus start the page storage first. The second die in the sequence will start storing its data page second, and so on.

In addition to the above, the programming duration (the time duration needed for a die to program a memory page, denoted $T_{PROG}$) varies statistically from one die to another. The die-to-die variation may be considerable, e.g., on the order of hundreds of microseconds for Most Significant Bit (MSB) page programming in a Multi-Level Cell (MLC) Flash die.

In some embodiments, when performing a parallel storage operation in a given stripe, processor 44 sets the order in which it sends page write commands to the dies based on the actual programming durations of the dies. Typically, slower dies (large $T_{PROG}$) are positioned first in the order, and faster dies (small $T_{PROG}$) are positioned last. By setting the programming order in this manner, slower dies will begin programming their respective data pages early. As a result, the overall programming duration of the stripe is minimized.

Consider, for example, a stripe that is made-up of two dies. For such a stripe, the reduction in overall programming time is min(IO,dProg), wherein IO denotes the Input/Output (IO) time of sending a page programming command to a die, and dProg denotes the difference in $T_{PROG}$ between the two dies.

Figure 2:
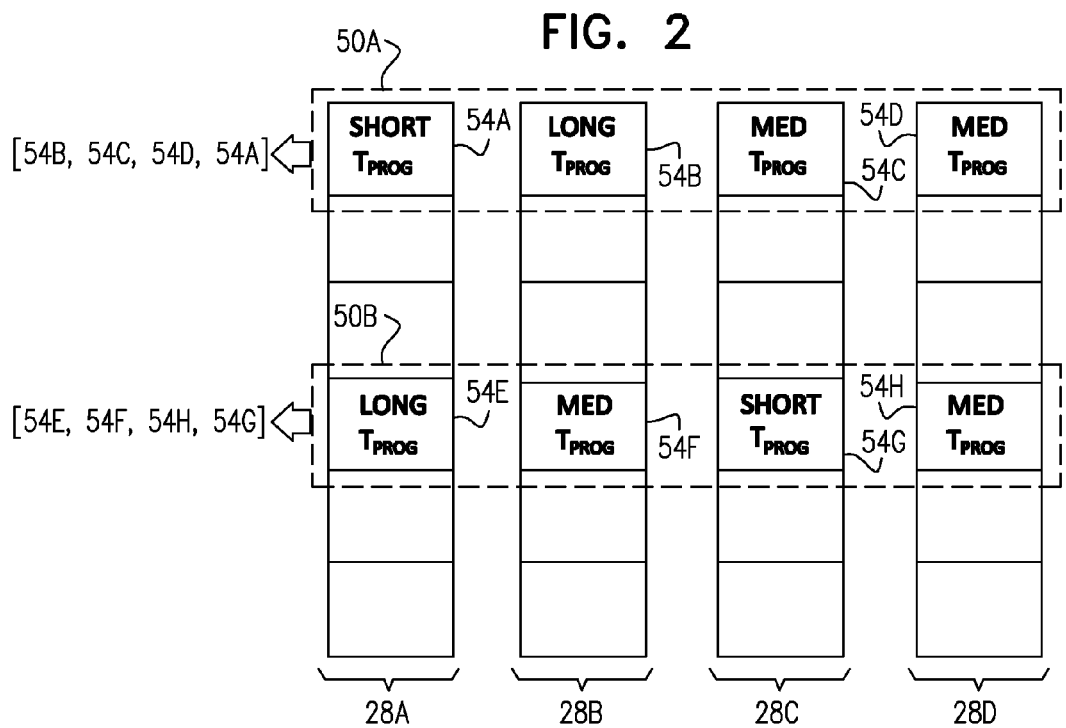
FIG. 2 is a diagram that schematically illustrates ordering of parallel programming operations based on die programming durations, in accordance with an embodiment that is described herein.

FIG. 2 is a diagram that schematically illustrates ordering of parallel programming operations based on die programming durations, in accordance with an embodiment that is described herein. The example of FIG. 2 shows four memory devices 28A ... 28D, each comprising multiple dies. Two exemplary stripes are shown—A first stripe 50A comprising dies 54A ... 54D, and a second stripe 50B comprising dies 54E ... 54H.

The example of FIG. 2 is chosen purely for the sake of conceptual clarity. In alternative embodiments, any other configuration can be used, for example a configuration involving any other suitable number of memory devices and any other suitable number of dies per stripe.

In the present example, in stripe 50A die 54A has a short $T_{PROG}$, die 54B has a long $T_{PROG}$, and dies 54C and 54D have some medium $T_{PROG}$. The die programming order set for stripe 50A is shown on the left-hand-side of the figure—Processor 44 programs die 54B first, then 54C, then 54D and finally 54A. In the selected order, the slowest die (54B) is programmed first, and therefore begins storing its respective data page first. The programming order is inversely related to $T_{PROG}$—The faster the die, the later it is positioned in the order. As a result, the overall programming time of the stripe is minimized.

In stripe 50B, die 54E has a long $T_{PROG}$, die 54F has a medium $T_{PROG}$, dies 54G has a short $T_{PROG}$, and die 54H has a medium $T_{PROG}$. In this stripe, processor 44 programs die 54E first, then 54F, then 54H and finally 54G. In this example, too, the slowest die (54E) is programmed first, and the programming order is inversely related to $T_{PROG}$.

The specific programming orders shown in FIG. 2 are chosen by way of example. In alternative embodiments, processor 44 may set any other suitable programming order per stripe, based on the programming durations of the dies.

In some embodiments, processor 44 holds, for each stripe, information that is indicative of the programming durations of the various dies in the stripe. The processor uses this information for setting the die programming order in parallel storage operations performed in the stripe.

The information for a given stripe may comprise, for example, a mapping table that specifies the desired programming order. For example, for stripe 50A of FIG. 2 the mapping table may be of the form [2,3,4,1], indicating that the first die to be programmed in the second die in the stripe (54B), the next die to be programmed is the third die in the stripe (54C), the next die to be programmed is the fourth die in the stripe (54D), and the last die to be programmed is the first die in the stripe (54A). Similarly, for stripe 50B of FIG. 2 the mapping table may be of the form [1,2,4,3].

Alternatively, the information indicative of the programming durations of the various dies may be represented and stored in any other suitable form.

In some practical cases, in MLC memory, the relative order of die programming durations may differ from one page type to another. For example, in an MLC stripe, a given die may be the fastest in programming Least Significant Bit (LSB) pages, but not the fastest in programming Most Significant Bit (MSB) pages. Thus, in some embodiments, processor 44 may set the programming order of the dies in a given stripe in accordance with a selected page type (e.g., LSB or MSB). Alternatively, the processor may hold multiple programming orders, and program each page type in accordance with the programming durations corresponding to that page type.

In some embodiments, the programming durations $T_{PROG}$ of the different dies are estimated (e.g., measured), and the information (e.g., mapping tables) are produced during production testing of the dies or of memory system 20. Additionally or alternatively, processor 44 may assess the $T_{PROG}$ values and generate or update the information (e.g., mapping tables) during normal operation of system 20 in a host system. Such update may be performed, for example, every certain number of programming cycles, every certain period of time, or in response to certain events.

Figure 3:
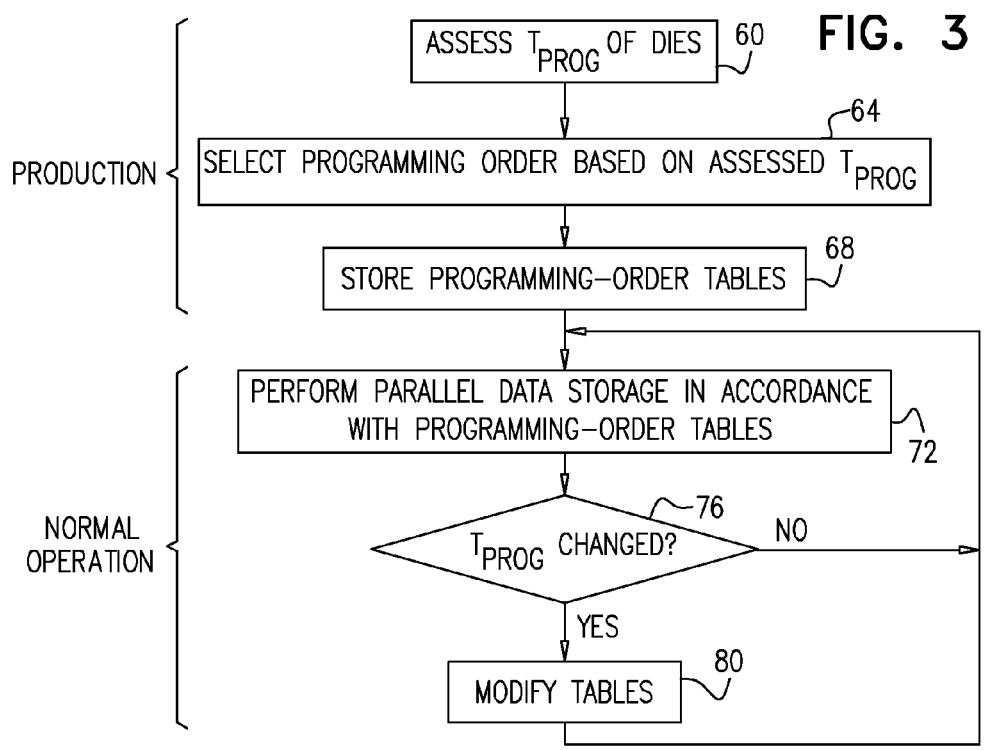
FIG. 3 is a flow chart that schematically illustrates a method for parallel data storage, in accordance with an embodiment that is described herein.

FIG. 3 is a flow chart that schematically illustrates a method for parallel data storage, in accordance with an embodiment that is described herein. The method begins with assessing the programming durations of the various Flash dies, at a $T_{PROG}$ estimation step 60. Based on the assessed programming durations, a respective die programming order is chosen for each stripe, at an order setting step 64. Mapping tables (also referred to as programming-order tables) are generated from the selected programming orders. The tables are stored in processor 44, at a table storage step 68. Steps 60-68 in this example are performed during production testing of the dies, memory devices 28 or system 20.

During normal operation of system 20 in a host system, processor 44 performs parallel storage operations in the various stripes using the mapping tables, at a parallel storage step 72. In some embodiments, processor 44 re-assesses the $T_{PROG}$ values and checks whether $T_{PROG}$ values of any of the have changed, at a change checking step 76. If not, the method loops back to step 72 above. If a change was found, processor 44 updates the mapping tables with new programming orders that reflect the new $T_{PROG}$ values, at a table updating step 80. The method loops back to step 72 above.

The method of FIG. 3 is depicted purely by way of example. In alternative embodiments, any other suitable method can be used. For example, the mapping tables may be produced only during production, or only during normal operation.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a memory system that stores data in a memory, estimating respective actual programming durations of memory units of a given bit significance, which vary statistically among the memory units of the given bit significance; and
   storing data in a stripe that comprises a plurality of the memory units of the given bit significance, by programming the memory units in the stripe, all having the given bit significance, in an order that is set depending on the actual programming durations.

2. The method according to claim 1, wherein storing the data comprises setting the order to first program a memory unit having a longest actual programming duration among the memory units in the stripe.

3. The method according to claim 1, wherein storing the data comprises setting the order to be inversely related to the respective actual programming durations of the memory units in the stripe.

4. The method according to claim 1, further comprising:
estimating the actual programming durations of the memory units; and
generating the information during production testing of the memory system or of the memory units.

5. The method according to claim 1, further comprising:
estimating the actual programming durations of the memory units; and
updating the information, during operation of the memory system in a host system.

6. The method according to claim 1, wherein the memory units comprise respective memory dies.

7. The method according to claim 1, wherein the information comprises a table that specifies the order for the stripe, and wherein storing the data comprises querying the table and programming the memory units in the stripe in accordance with the order specified in the table.

8. An apparatus, comprising:
a memory storing multiple memory units; and
a processor configured to:
hold information indicative of respective actual programming durations of memory units of a given bit significance, which vary statistically among the memory units of the given bit significance; and
store data in a stripe that comprises a plurality of the memory units of the given bit significance, by programming the memory units in the stripe, all having the given bit significance, in an order that is set based on the information.

9. The apparatus according to claim 8, wherein the processor is configured to set the order to first program a memory unit having a longest actual programming duration among the memory units in the stripe.

10. The apparatus according to claim 8, wherein the processor is configured to set the order to be inversely related to the respective actual programming durations of the memory units in the stripe.

11. The apparatus according to claim 8, wherein estimation of the actual programming durations of the memory units, and generation of the information, are performed during production testing of the apparatus or of the memory units.

12. The apparatus according to claim 8, wherein the processor is configured to estimate the actual programming durations of the memory units, and to update the information, during operation of the apparatus in a host system.

13. The apparatus according to claim 8, wherein the memory units comprise respective memory dies.

14. The apparatus according to claim 8, wherein the information comprises a table that specifies the order for the stripe, and wherein the processor is configured to store the data by querying the table and programming the memory units in the stripe in accordance with the order specified in the table.

15. An apparatus, comprising:
an interface configured to communicate with a memory storing multiple memory units; and
a processor configured to:
hold information indicative of respective actual programming durations of the memory units of a given bit significance, which vary statistically among the memory units of the given bit significance; and
store data in a stripe that comprises a plurality of the memory units of the given bit significance, by programming the memory units in the stripe, all having the given bit significance, in an order that is set based on the information.

16. The apparatus according to claim 15, wherein the processor is configured to set the order to first program a memory unit having a longest actual programming duration among the memory units in the stripe.

17. The apparatus according to claim 15, wherein the processor is configured to set the order to be inversely related to the respective actual programming durations of the memory units in the stripe.

18. The apparatus according to claim 15, wherein estimation of the actual programming durations of the memory units, and generation of the information, are performed during production testing of the apparatus or of the memory units.

19. The apparatus according to claim 15, wherein the processor is configured to estimate the actual programming durations of the memory units, and to update the information, during operation of the apparatus in a host system.

20. The apparatus according to claim 15, wherein the information comprises a table that specifies the order for the stripe, and wherein the processor is configured to store the data by querying the table and programming the memory units in the stripe in accordance with the order specified in the table.

* * * * *